United States Patent [19]

Eisner

[11] 3,828,891
[45] Aug. 13, 1974

[54] SEISMIC PULSE GENERATOR
[75] Inventor: Elmer Eisner, Houston, Tex.
[73] Assignee: Texaco Inc., New York, N.Y.
[22] Filed: Dec. 27, 1972
[21] Appl. No.: 318,811

[52] U.S. Cl.............................. 181/119, 340/15.5 R
[51] Int. Cl................................................. G01v
[58] Field of Search ... 181/.5 H; 60/54.5 H, DIG. 2; 91/339; 340/15.5 FB

[56] References Cited
UNITED STATES PATENTS
3,516,510  6/1970  Coburn............................. 181/.5 H
3,718,205  2/1973  Fair................................. 181/.5 H Primary Examiner—Benjamin A. Borchelt
Assistant Examiner—J. V. Doramus
Attorney, Agent, or Firm—Thomas H. Whaley; C. G. Ries

[57] ABSTRACT

Disclosed is a system for minimizing distortion in the continuity of the input energy of a seismic energy generator. In a hydraulically operated oscillatory seismic generator, the continuity of the seismic energy input to the ground is affected by the valve operation. The present system employs a differential pumping system to control the pressure input to the hydraulic seismic generator without requiring valves thereby eliminating distortion due to valves.

4 Claims, 2 Drawing Figures

PATENTED AUG 13 1974                                    3,828,891

3,828,891

SEISMIC PULSE GENERATOR

BACKGROUND OF THE INVENTION

This invention relates generally to improvements and systems for input of a seismic energy pulse to earth formations, and more particularly, for establishing an undistorted pulse input for a vibratory seismic generator by use of a differential pumping system.

In geophysical prospecting, a seismic generator inputs energy into the earth at one point along a traverse so that the energy is transmitted through the earth from the input point and received at second locations along the traverse, the energy being propagated through the ground along a plurality of paths. One such seismic generator is known as a "Vibroseis" and it generally consists of a hydraulic oscillator which generates vertical oscillations of a plate having a mass and the vertical oscillations input energy to the ground. The oscillation or frequency is controlled by an input control for the oscillator. Typically in an operation utilizing this type of source, the frequency is varied between a range of 5 to 50 hz within a predetermined time period. The hydraulic oscillator employs a piston and cylinder arrangement where the piston is oscillated with respect to the cylinder and driven by hydraulic pressure where the hydraulic pressure is alternately applied to opposite sides of the piston. A four-way valving system is typically employed to reverse the pressure applied to the piston so that one side of the piston is pressured while the other side is open to exhaust. The energy input is generally sinusoidal and at the peak amplitudes the operation of the valve system introduces a distortion into the energy input to the ground so that the input energy wave is distorted from its sinusoidal configuration. The detection and interpretation of transmitted energy is difficult enough without introducing distorted energy waves so it is desirable to eliminate distortion.

SUMMARY OF THE INVENTION

Briefly stated, the present invention contemplates a novel method and apparatus producing a sinusoidal energy input to the earth formations. This is accomplished by a system employing a hydraulic cylinder and piston arrangement where the lower chamber to one side of the piston is fluidly coupled by a first pump to the upper chamber on the other side of the piston where the first pump directs fluid from the lower chamber to the upper chamber. The upper chamber is fluidly coupled by a second pump from the upper chamber to the lower chamber to direct fluid from the upper chamber to the lower chamber. By controlling the pumping rates of the pumps relative to one another, undistorted sinusoidal operation can be obtained from a hydraulic siesmic generator.

The present invention and novel features thereof are set forth in the appended claims. The invention itself, as well as its purposes and advantages, will be best understood from the description when taken in conjunction with the accompanying drawings in which:

DESCRIPTION OF THE PREFERRED EMBODIMENT

Figure 1:
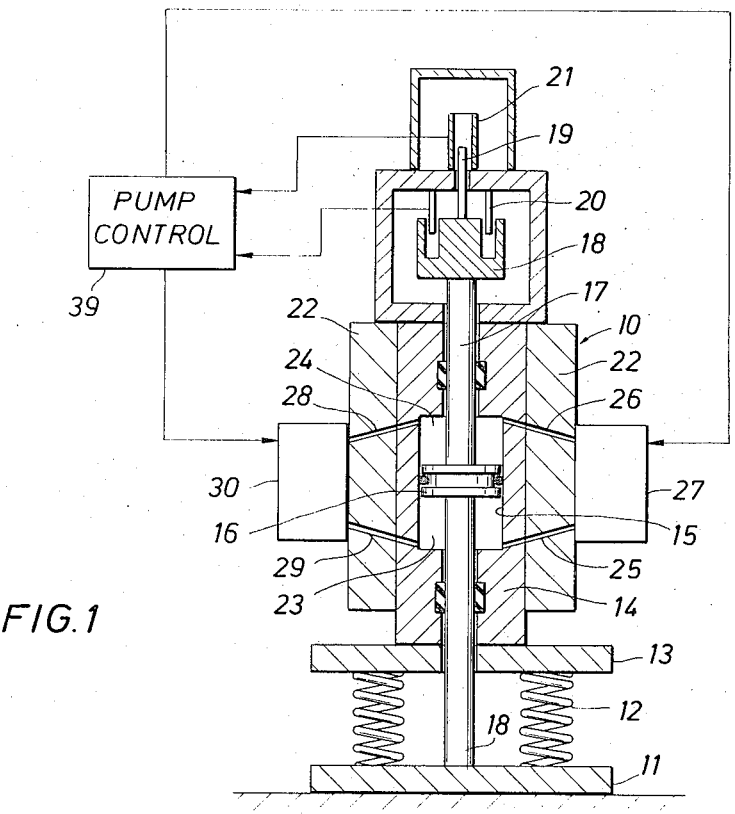
FIG. 1 is a schematic illustration of a typical vibratory type of seismic survey system.

Referring now to the drawings, in FIG. 1 there is shown a seismic exploration unit where a vibratory seismic source 10 is located on the earth's surface and is used to generate seismic energy waves for propagation through the earth. A series of seismometers (not shown) are arranged in a predetermined geometric array along a traverse to detect the seismic energy waves which were generated by the vibrator 10. The seismic energy can travel as surface waves, reflected and refracted waves in a well known manner. The energy detected by the seismometers is the result of the superposition of all of the individual waves (surface, refracted and reflected) reaching each of the seismometers after traveling from the source generator 10. Obviously the individual components of this complex received energy have the frequency characteristics of the transmitted energy and have the travel times associated with their particular path to the detector. The electrical signals produced by the seismometer in response to the seismic energy are recorded simultaneously, but individually on separate tract in a conventional recording means (not shown). The individual signals can also be recorded on tape so that they can be reproduced at a later time for further analysis.

The vibrator 10 as shown schematically and partially in FIG. 1 may be of the type disclosed in U.S. Pat. No. 3,282,372. The vibrator 10 includes a foot plate 11 which is in contact with the earth's surface. Static loading springs 12 are disposed between the foot plate and a base plate 13. The base plate 13 supports an attached cylinder 14 having an internal cylinder bore 15 which receives a piston 16. The piston 16 is attached to upper and lower piston rods 17 and 18 which are slidably and sealingly received in the cylinder bores. The lower rod 17 is attached to the foot plate 11, while the upper rod 18 has mounted thereon cores 18 and 19 associated with windings 20 and 21 of a pair of control transformers. The control transformers are used for governing the stroke of the piston 16. A hydraulic manifold 22 is connected to the cylinder 14. The cylinder 15 is separated by the piston 16 into first and second chambers 23 and 24. A first fluid transfer path is provided by ports 26 and 25 where the port 25 couples the first chamber 23 to a pump 27 and the port 26 couples the pump to the second chamber 24. Flow of fluid is from chambers 23 to 24 by the pump 27. A second fluid transfer path is provided by the ports 28 and 29 where the port 28 couples the second chamber to a second pump 30 and the port 29 couples the pump 30 to the first chamber. With this arrangement the pump 27 can pump fluid from the first to the second chamber while the pump 30 can pump fluid from the second to the first chamber. If the pumps have equal pumping rates then there is no change in the position of the piston. By adjusting the relative pumping rates of one pump relative to the other pump the piston can be moved.

Figure 2:
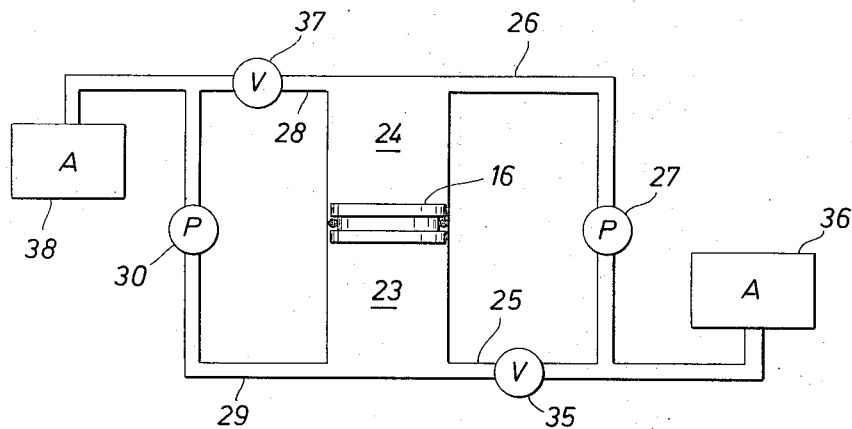
FIG. 2 is a simplified illustration of a hydraulic system for obtaining differential pumping pressures across the piston of the hydraulic vibrator.

As illustrated schematically in FIG. 2, the first fluid transfer path can include a one way check valve 35 and an accumulator 38 in the input side to the pump 27. Similarly the second fluid transfer path an include a one way check valve 37 and accumulator 38 in the input side to the pump 30. By regulating the relative pumping rates between the pumps 27 and 30 a differential pressure is created across the piston 16. This regulation is adjusted to provide a smooth harmonic motion to the piston 16 which eliminates any distortion because of switching of transfer valves as the fluid is continuously pumped from one chamber to the other and the regulation is in the relative pumping rates of the pumps. By coupling of the control transformers to the control 39 for the pumps, a self-regulating system is provided. The control 39 performs the function of regulating the relative differential in the pumping rates to provide the harmonic motion for the piston relative to the cylinder.

From the foregoing description, it will be appreciated that this invention has provided a system for eliminating valves in a hydraulic seismic vibrator and thereby eliminated distortion effects due to operation of the valves. While only one embodiment together with modifications has been described in detail herein and shown in the accompanying drawings, it will be evident that various further embodiments are possible without departing from the scope of the invention.

What is claimed is:

1. A hydraulic vibratory seismic energy source including a cylinder and piston where one of said cylinder and piston is coupled to a foot plate and the other of said cylinder and piston is coupled to a reaction mass; means for reciprocating said piston and cylinder relative to one another including a first fluid transfer path coupling one end of said cylinder to the other end for fluid flow in a first direction, a second fluid transfer path coupling the other end of said cylinder to said one end for fluid flow in said first direction;

said fluid transfer paths including first and second pumping means for directing said fluid flow in said first direction whereby a differential in pumping rates can be used to reciprocate said piston and cylinder relative to one another.

2. The source according to claim 1 and further including in the fluid transfer paths a one way check valve between the cylinder and the input to a pumping means.

3. The source according to claim 2 and further including in the fluid transfer paths, an accumulator between a check valve and the input to a pumping means.

4. The source according to claim 1 and further including means for operating said pumping means relative to one another to produce a relative harmonic motion of said piston relative to said cylinder.

* * * * *